(12) United States Patent
Hasegawa et al.

(10) Patent No.: US 12,478,339 B2
(45) Date of Patent: Nov. 25, 2025

(54) ROUND RADIOGRAPHY SYSTEM, CONSOLE FOR ROUND RADIOGRAPHY, AND RECORDING MEDIUM (71) Applicant: Konica Minolta, Inc., Tokyo (JP)

(72) Inventors: Satoshi Hasegawa, Tokyo (JP); Naoki Hayashi, Higashimurayama (JP); Akira Hiroshige, Kokubunji (JP); Kenichi Yanagisawa, Kokubunji (JP)

(73) Assignee: KONICA MINOLTA, INC., Tokyo (JP)

(*) Notice: Subject to any disclaimer, the term of this patent is extended or adjusted under 35 U.S.C. 154(b) by 243 days.

(21) Appl. No.: 18/490,350

(22) Filed: Oct. 19, 2023

(65) Prior Publication Data
US 2024/0156425 A1 May 16, 2024

(30) Foreign Application Priority Data

Nov. 10, 2022 (JP) .................. 2022-180195

(51) Int. Cl.
A61B 6/00 (2024.01)
A61B 6/46 (2024.01)
G06T 7/00 (2017.01)

(52) U.S. Cl.
CPC ............ A61B 6/463 (2013.01); A61B 6/4405 (2013.01); A61B 6/467 (2013.01); A61B 6/5294 (2013.01); G06T 7/0016 (2013.01); G06T 2207/10116 (2013.01); G06T 2207/30004 (2013.01)

(58) Field of Classification Search
CPC ....... A61B 6/4405; A61B 6/463; A61B 6/467; A61B 6/5294; A61B 6/4494; A61B 6/548; A61B 2560/0431; G06T 7/0016; G06T 2207/30004
See application file for complete search history.

(56) References Cited

FOREIGN PATENT DOCUMENTS

JP 2015-196073 A 11/2015
JP 2023088666 A * 6/2023 ............. A61B 6/544

* cited by examiner

Primary Examiner — Don K Wong
(74) Attorney, Agent, or Firm — LUCAS & MERCANTI, LLP (57) ABSTRACT A round radiography system performing round radiography using a radiographic imaging apparatus includes: a hardware processor that obtains examination information on an examination performing round radiography, and generates additional information for supporting the round radiography in the examination; and a display that displays the obtained examination information, and the generated additional information. The additional information is at least any of a size of the radiographic imaging apparatus, information about appropriateness of a radiographic image, radiographic difficulty, information about trimming of the radiographic image, information on a radiographer, and information about change from a predetermined radiographic condition, in past radiography of a subject of the examination or a subject having a physical size similar to that of the subject.

5 Claims, 6 Drawing Sheets

| PATIENT RECEPTION ▼ | EXAMINATION LIST | 6 | EXAMINATION HISTORY | 1 | PAST EXAMINATION | 8 | SUSPENDED | 1 | | |
|---|---|---|---|---|---|---|---|---|---|---|
| REQUESTING DEPARTMENT ▼ | | | WARD | ▼ | | ▽ | CLEAR | NARROW DOWN | | |
| PATIENT ID | KANJI NAME | GENDER | BIRTH DATE | | RADIOGRAPHY SITE | | | STATE | | |
| 123 | ○○太郎 | MALE | JAN. 20, 1970 | CHEST RECUMBENT POSITION, PORTABLE | | | | NON-RADIOGRAPHED | | |
| 6789 | △△二郎 | MALE | NOV. 22, 1983 | WRIST | | | | NON-RADIOGRAPHED | | |
| 1115 | ◇◇やよい | FEMALE | AUG. 3, 1956 | ABDOMEN SITTING POSITION, PORTABLE | | | | NON-RADIOGRAPHED | | |
| 1383 | ▽▽さつき | FEMALE | MAY 22, 1948 | CHEST RECUMBENT POSITION, PORTABLE | | | | NON-RADIOGRAPHED | | |
| 2256 | ××恵子 | FEMALE | OCT. 10, 1962 | WRIST | | | | NON-RADIOGRAPHED | | |
| 4987 | △▽三朗 | MALE | JUN. 7, 1952 | ABDOMEN SITTING POSITION, PORTABLE | | | | NON-RADIOGRAPHED | | |
| 4546 | ▽△吾郎 | MALE | MARCH 4, 1968 | CHEST RECUMBENT POSITION, PORTABLE | | | | NON-RADIOGRAPHED | | |

PAST EXAMINATION

| PATIENT ID | 123 | ALPHABETICAL NAME | ○○ TARO |
|---|---|---|---|
| KANJI NAME | ○○太郎 | KANA NAME | ○○ タロウ |
| BIRTH DATE | JAN. 20, 1970 | AGE | 52 YEARS AND 9 MONTHS |
| GENDER | MALE | PATIENT COMMENT | not set |

UPDATE

SYSTEM   START EXAMINATION

FIG. 5

2022/01/13  20:25   TECHNICIAN: XXX

| PATIENT RECEPTION | EXAMINATION LIST | 4 | EXAMINATION HISTORY | 3 | PAST EXAMINATION | 8 | ALL EXAMINATIONS | SUSPENDED | 0 | CLEAR | NARROW DOWN |

KANJI NAME ▼    RADIOGRAPHY SITE ▼

| PATIENT ID | KANJI NAME | RADIOGRAPHY SITE | RADIOGRAPHY TIME AND DATE | PANEL SIZE | TUBE VOLTAGE | mAs | S-VALUE |
|---|---|---|---|---|---|---|---|
| 123 | ○○太郎 | CHEST RECUMBENT POSITION, PORTABLE | 10:13:44, JUL. 24, 2022 | 14x17 | 120 | 2.0 | 200 |
| 123 | ○○太郎 | CHEST RECUMBENT POSITION, PORTABLE | 10:39:21, JUL. 25, 2022 | 17x17 | 120 | 2.0 | 200 |
| 123 | ○○太郎 | ABDOMEN SITTING POSITION, PORTABLE | 10:29:11, JUL. 26, 2022 | 17x17 | 120 | 2.0 | 198 |
| 123 | ○○太郎 | ABDOMEN SITTING POSITION, PORTABLE | 10:45:23, JUL. 26, 2022 | 17x17 | 100 | 2.0 | 197 |
| 6789 | △△二郎 | WRIST | 10:00:21, JUN. 18, 2022 | 14x17 | 100 | 2.0 | 202 |
| 6789 | △△二郎 | WRIST | 11:22:51, JUL. 25, 2022 | 14x17 | 100 | 2.0 | 201 |
| 6789 | △△二郎 | WRIST | 11:40:41, JUL. 25, 2022 | 14x17 | 100 | 2.0 | 196 |

PAST EXAMINATION

| PATIENT ID | 123 | | ALPHABETICAL NAME | ○○ TARO |
| KANJI NAME | ○○太郎 | | KANA NAME | ○○ タロウ |
| BIRTH DATE | JAN. 20, 1970 | | AGE | 52 YEARS AND 9 MONTHS |
| GENDER | MALE | | PATIENT COMMENT | not set |

UPDATE

SYSTEM                                   START EXAMINATION

FIG. 6

ROUND RADIOGRAPHY SYSTEM, CONSOLE FOR ROUND RADIOGRAPHY, AND RECORDING MEDIUM

CROSS-REFERENCE TO RELATED APPLICATIONS

The entire disclosure of Japanese Patent Application No. 2022-180195 filed on Nov. 10, 2022 is incorporated herein by reference in its entirety.

TECHNICAL FIELD

The present invention relates to a round radiography system, a console for round radiography, and a recording medium.

DESCRIPTION OF THE RELATED ART

In a medical facility, besides general radiography that takes radiographs in a radiography room, round radiography that takes radiographs while taking rounds in wards is performed.

In the case of general radiography, a patient entering the radiography room is visually identified, and the size of a radiographic imaging apparatus (FPD (Flat Panel Detector)) to be used and an irradiation condition can be determined in conformity with the physical size of the patient. Access is allowed to a PACS (Picture Archiving and Communication System) or the like from a console in the radiography room, and past radiography information can be referred to.

On the other hand, round radiography has less information obtainable during radiograph preparation than general radiography does, and information required for a less-experienced technician to make a determination is sometimes insufficient. For example, round radiography requires preparation of a radiographic imaging apparatus to be used for radiography, and visitation to the patient. However, since the patient is absent when the size of the radiographic imaging apparatus is selected, the size cannot be determined with visual identification of the patient. At a radiography destination, such as a ward, access to PACS is unavailable due to the communication environment, and past radiography information cannot be referred to in some cases.

As for the technique of supporting round radiography, for example, JP2015-196073A discloses a technique that obtains past radiographic images of a radiography subject patient and radiographic conditions (specifically, irradiation conditions) before a round with a mobile X-ray instrument, and displays the obtained past radiographic images and radiographic conditions at the time of radiography.

SUMMARY OF THE INVENTION

Unfortunately, only displaying of direct information about radiography, such as past radiographic images and irradiation conditions as in JP2015-196073A is insufficient for efficient round radiography.

The present invention has been made in view of the problem described above, and has an object to provide effective information for efficient round radiography.

To achieve at least one of the abovementioned objects, according to an aspect of the present invention, a round radiography system reflecting one aspect of the present invention is a round radiography system performing round radiography using a radiographic imaging apparatus, the system including:

a hardware processor that obtains examination information on an examination performing round radiography, and generates additional information for supporting the round radiography in the examination; and
a display that displays the obtained examination information, and the generated additional information,
wherein
wherein the additional information is at least any of a size of the radiographic imaging apparatus, information about appropriateness of a radiographic image, radiographic difficulty, information about trimming of the radiographic image, information on a radiographer, and information about change from a predetermined radiographic condition, in past radiography of a subject of the examination or a subject having a physical size similar to that of the subject.

To achieve at least one of the abovementioned objects, according to an aspect of the present invention, a console for round radiography reflecting one aspect of the present invention including:

a hardware processor that obtains examination information on an examination performing round radiography, and generates additional information for supporting the round radiography in the examination, using a radiographic imaging apparatus; and
a display that displays the obtained examination information, and the generated additional information,
wherein
wherein the additional information is at least any of a size of the radiographic imaging apparatus, information about appropriateness of a radiographic image, radiographic difficulty, information about trimming of the radiographic image, information on a radiographer, and information about change from a predetermined radiographic condition, in past radiography of a subject of the examination or a subject having a physical size similar to that of the subject.

To achieve at least one of the abovementioned objects, according to an aspect of the present invention, a recording medium reflecting one aspect of the present invention is a non-transitory computer-readable recording medium storing a program for causing a computer of a round radiography system to execute:

obtaining examination information on an examination performing round radiography, using a radiographic imaging apparatus;
generating additional information for supporting the round radiography in the examination; and
causing a display to display the obtained examination information, and the generated additional information,
wherein the additional information is at least any of a size of the radiographic imaging apparatus, information about appropriateness of a radiographic image, radiographic difficulty, information about trimming of the radiographic image, information on a radiographer, and information about change from a predetermined radiographic condition, in past radiography of a subject of the examination or a subject having a physical size similar to that of the subject.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

(Configuration of Round Radiography System 10)

First, the configuration of an embodiment of the present invention is described.

Figure 1:
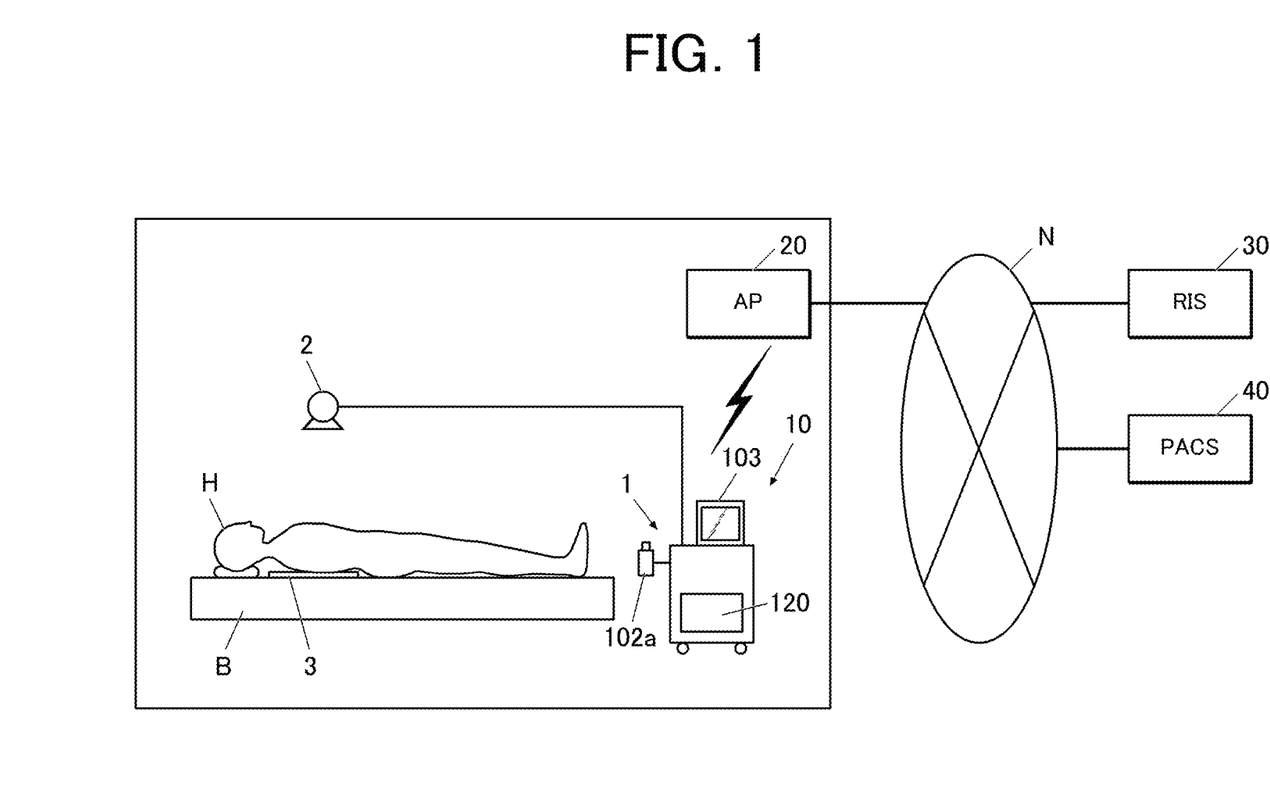
FIG. 1 is a diagram showing a configuration example of an in-hospital system that includes a round radiography system in this embodiment.

FIG. 1 is a diagram showing a configuration example of an in-hospital system that includes a round radiography system 10 in this embodiment. As shown in FIG. 1, the round radiography system 10 is connected to an RIS (Radiology Information System) 30 and a PACS 40 via a communication network N, such as a LAN (Local Area Network), allowing data to be transmitted and received. The round radiography system 10 is connected to the communication network N via a wireless access point (AP) 20 of a wireless LAN or a wired LAN cable, not shown. A plurality of the wireless access points 20 are provided in a medical facility. Note that the number of round radiography systems 10 is not specifically limited. Although not shown, a console, a modality, an HIS (Hospital Information System), an electronic medical record system and the like provided in the radiography room are also connected to the communication network N.

The round radiography system 10 is, for example, a system for radiographing patients having difficulty in mobility in rounds, and includes a main body 1, a radiation source 2, an FPD (Flat Panel Detector) cassette 3. The round radiography system 10 includes wheels at the main body 1, and is thus configured as a mobile round cart. The main body 1 is provided with a recess 120 for storing the FPD cassette 3. The recess 120 is provided with a connector 108 (see FIG. 2) for connection with the stored FPD cassette 3, allowing a battery 301 (see FIG. 2) of the stored FPD cassette 3 to be conveyed while being charged.

Note that the round radiography system 10 may be a portable system that includes no wheel.

The round radiography system 10 is brought into an operating room, an intensive-care unit, a ward or the like. As shown in FIG. 1, for example, the FPD cassette 3 is brought into a state of being between a subject H lying on a bed and this bed B, or of being inserted into an inlet that is not shown and provided on a surface of a bed B opposite to the subject H, radiation is emitted from the radiation source 2, and the subject H is radiographed.

Figure 2:
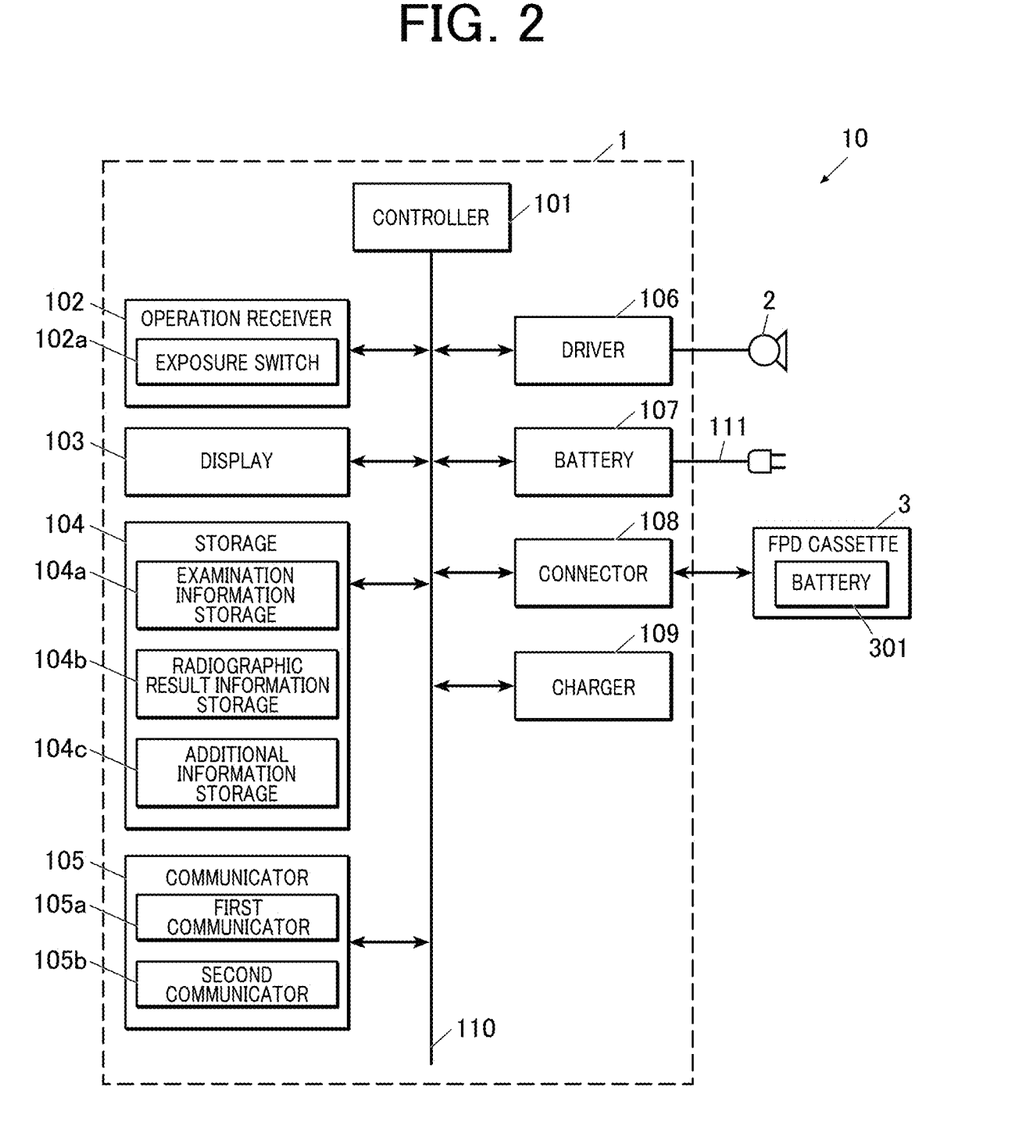
FIG. 2 is a block diagram showing a functional configuration of the round radiography system.

FIG. 2 is a block diagram showing a functional configuration of the round radiography system 10.

The main body 1 of the round radiography system 10 has a function as that of a console for round radiography that controls round radiography, and includes a controller 101 (hardware processor), an operation receiver 102, a display 103, a storage 104, a communicator 105, a driver 106, a battery 107, a connector 108, and a charger 109, as shown in FIG. 2; these components are connected via a bus 110.

The controller 101 includes a central processing unit (CPU), a random access memory (RAM), and the like. In response to an input through the operation receiver 102, a CPU of the controller 101 reads a system program and various processing programs stored in the storage 104, deploys the programs in a RAM, and executes various processes in accordance with the deployed programs. The controller 101 functions as an obtainer, and a generator according to the present invention.

The operation receiver 102 includes a touch panel that includes transparent electrodes arranged in a grid like manner so as to cover the surface of the display 103, detects a position pressed by a finger, a stylus or the like, and inputs information on the position as operation information into the controller 101.

The operation receiver 102 includes an exposure switch 102a for allowing a user to issue an instruction for starting exposure.

The display 103 includes a monitor, such as an LCD (Liquid Crystal Display) or a CRT (Cathode Ray Tube), and performs displaying in accordance with an instruction in a display signal input from the controller 101.

The storage 104 includes a nonvolatile semiconductor memory, and a hard disk. The storage 104 stores various programs executed by the controller 101, parameters required to execute processes according to the programs, or data on processing results, etc.

For example, the storage 104 stores a radiographic condition table and the like that include radiographic conditions (irradiation conditions (a tube voltage, a tube current, an irradiation time period, an exposure dose, a source to image distance (SID), etc.) and reading conditions (a panel size etc.)) predetermined for each radiography site, in association with the radiography site. The panel size is the size of the FPD cassette 3.

In this embodiment, the storage 104 includes an examination information storage 104a, a radiographic result information storage 104b, and an additional information storage 104c.

The examination information storage 104a stores examination information (examination order information) obtained from the RIS 30. Here, the examination information obtained from the RIS 30 includes, for example, an examination ID, examination time and date (radiography time and date), patient information about a patient serving as a subject (patient ID, name, gender, age, height, weight, etc.), information about each time of radiography performed in an examination (radiography site, radiography direction, modality, etc.), a requesting department, and a ward.

The radiographic result information storage 104b stores information about radiography performed in the past (radiographic result information). The radiographic result information includes, for example, basic information, such as the patient information, radiography site, radiography time and date, ward, and requesting department, and further includes at least any of, the panel size, irradiation condition, information about appropriateness of a radiographic image, radiographic difficulty, information about trimming of the radiographic image, information on a radiographer, information about change from predetermined radiographic conditions, and physical size information on a subject.

Here, the information about appropriateness of a radiographic image includes, for example, the dose indices (exposure index (EI), deviation index (DI), and target exposure index (EIT)), and S-value. The dose indices are values serving as indices for determining whether the dose required to achieve an appropriate image quality reaches the FPD cassette 3 or not. The S-value is an index representing the sensitivity of a radiographic image. Alternatively, an appropriateness evaluation value (A, B, C, etc.) on a radiographic image input by the user may be adopted as information about appropriateness of a radiographic image.

The radiographic difficulty may be, for example, the number of retakes. Alternatively, a radiographic difficulty (A, B, C, etc.) set by the user may be adopted as radiographic difficulty.

The information about trimming of the radiographic image may be, for example, the trimming size of a radiographic image. The representation of the trimming size may be "half, quarter, ... ", a numerical value (e.g., 300 mm×200 mm etc.), 14×17, or the like.

The information on a radiographer may be, for example, the name of a technician.

The physical size information on a patient is information indicating the classification of the physical size of a patient, and may be, for example, information on any of "large, medium, and small". Alternatively, the height, weight, body thickness or the like of a patient may be adopted as physical size information.

When the panel size is changed from what is predetermined for the radiography site, a change flag ON is added to the panel size in the radiographic result information. When the irradiation condition is changed from what is predetermined for the radiography site, a change flag ON is added to each irradiation condition in the radiographic result information. The panel size and the irradiation condition to which the change flag ON is added is information about change from the predetermined radiographic conditions.

Note that the radiographic result information storage 104b may further store radiographic images obtained by past radiography, in association with the radiographic result information.

The additional information storage 104c temporarily stores additional information that is generated in round radiography and is for supporting the round radiography.

The communicator 105 includes: a first communicator 105a for transmitting and receiving data to and from the FPD cassette 3 through wired communication or wireless communication; and a second communicator 105b for transmitting and receiving (outputting and inputting) data to and from an external apparatus, such as the RIS 30 and the PACS 40, connected to the communication network N via the wireless access point 20 or the wired LAN cable, not shown.

The driver 106 is a circuit that drives a tube of the radiation source 2. The driver 106 and the radiation source 2 are connected via a cable.

The battery 107 supplies power to each component of the main body 1 and the radiation source 2. The battery 107 can be charged from the outside via an AC cable 111. The battery 107 is preliminarily charged via the AC cable 111 in a time slot where no radiographic operation is scheduled, and the AC cable 111 is stored in the main body 1 during conveyance.

The connector 108 is provided in the recess 120, and electrically connected to the FPD cassette 3 stored in the recess 120.

The charger 109 is a circuit that changes the battery 301 of the FPD cassette 3 connected via the connector 108 with power supplied from the battery 107 in a non-radiography time period, based on control by the controller 101.

The radiation source 2 is driven by the driver 106, and irradiates the subject H with radiation (X-rays).

The FPD cassette 3 is a portable radiographic imaging apparatus that uses the rechargeable battery 301 as a drive source. The FPD cassette 3 includes, for example, a glass substrate. On predetermined positions on the substrate, a plurality of detection elements that detect radiation having been emitted from the radiation source 2 and at least passed through the subject H, in accordance with the intensity, convert the detected radiation into an electric signal, and accumulates the signal are two dimensionally arranged. The detection elements may be semiconductor image sensors, such as photodiodes. For example, each detection element is connected to a switcher, such as TFT (Thin Film Transistor). Accumulation and reading of the electric signal is controlled by the switcher, and image data (frame image) is obtained.

FPDs include an indirect type one that causes a photoelectric conversion element to convert radiation, via a scintillator, into an electric signal, and a direct type one that converts radiation directly into an electric signal. Any of them may be adopted as the FPD cassette 3.

The RIS 30 issues and stores examination information (examination order information). The examination information is associated with identification information on a console used for radiography based on the examination information, and the associated pieces of information are stored. The RIS 30 transmits the issued examination information to the console that performs radiography based on the examination information, on the basis of the identification information associated with the examination information. For example, examination information on round radiography is associated with the identification information on the main body 1 of the round radiography system 10. The RIS 30 transmits the examination information on round radiography to the main body 1 of the round radiography system 10.

The PACS 40 is an image management apparatus that stores and manages medical images (radiographic images) generated by a modality, such as the round radiography system 10, in association with the patient information and the examination information (examination ID, radiography time and date, radiography site, radiographic conditions, etc.).

(Operation of Round Radiography System 10)

Next, operation of the round radiography system 10 is described.

Figure 3:
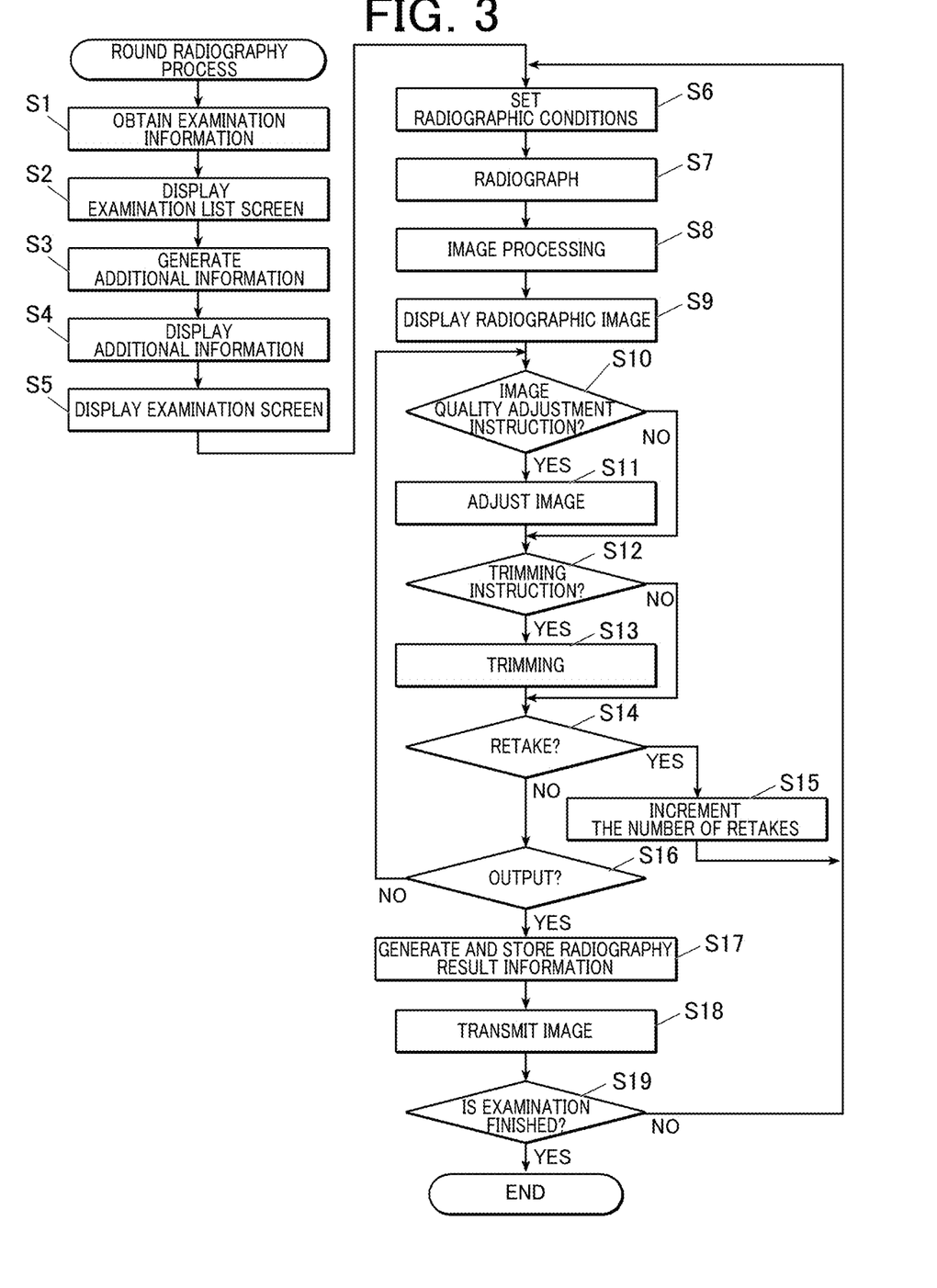
FIG. 3 is a flowchart showing a flow of a round radiography process executed by a controller in FIG. 2.

FIG. 3 is a flowchart showing the flow of a round radiography process executed by the main body 1 of the round radiography system 10. The round radiography process is executed by cooperation between the controller 101 of the main body 1 and the programs stored in the storage 104.

First, the controller 101 obtains examination information on an examination that performs round radiography (Step S1).

In Step S1, the controller 101 obtains the examination information from the RIS 30 through the second communicator 105b. For example, when a predetermined button (e.g., an update button 130b) displayed on an examination list screen 130 (see FIG. 4) of the display 103 is pressed through the operation receiver 102, the controller 101 transmits an examination information obtaining request to the RIS 30 through the second communicator 105b. In response to the request by the round radiography system 10, the RIS 30 reads, from the storage, the examination information associated with the identification information on the round radiography system 10, and transmits the information to the round radiography system 10. The controller 101 obtains (receives), through the second communicator 105*b*, the examination information transmitted from the RIS 30, and stores the information in the examination information storage 104*a*.

Note that the controller 101 may transmit the examination information obtaining request to the RIS 30 through the second communicator 105*b* at predetermined time intervals, and obtain the examination information. Alternatively, a configuration that transmits the examination information from the RIS 30 to the round radiography system 10 at predetermined time periods may be adopted, and the round radiography system 10 may obtain, through the second communicator 105*b*, the examination information transmitted from the RIS 30. Alternatively, instead of obtaining the examination information from the RIS 30, for example, the controller 101 may display an examination registration screen, not shown, on the display 103, and obtain examination information in accordance with an input through the examination registration screen.

Figure 4:
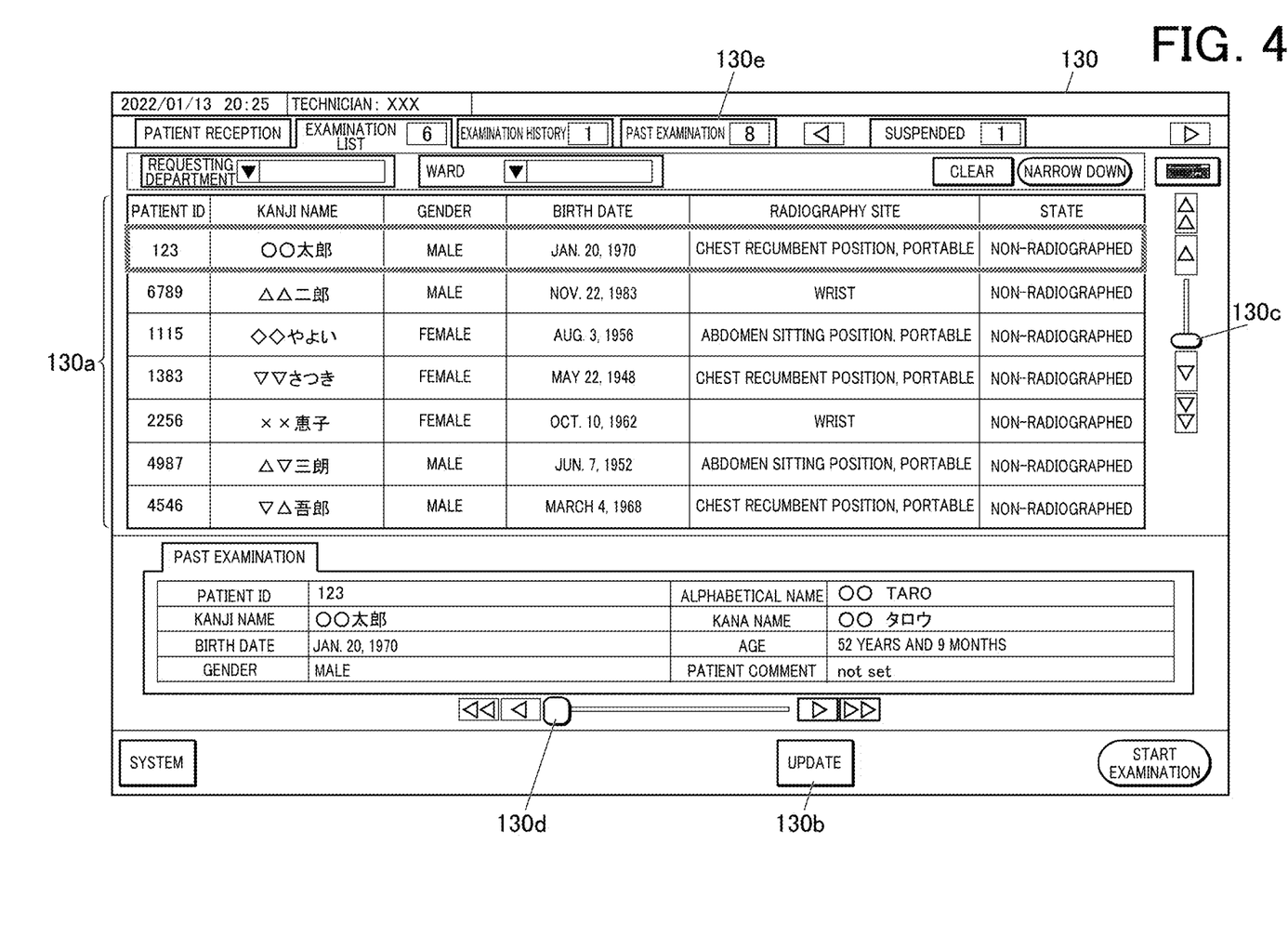
FIG. 4 shows an example of an examination list screen.

Next, the controller 101 displays the obtained examination information on the examination list screen 130 of the display 103 (Step S2).

FIG. 4 shows an example of the examination list screen 130 on which the examination information is list-displayed.

As shown in FIG. 4, the examination list screen 130 is provided with an examination list display field 130*a*, an update button 130*b*, a vertical scroll bar 130*c*, a horizontal scroll bar 130*d*, a past examination tab 130*e*, etc.

The examination list display field 130*a* is a field for list-displaying the examination information obtained in Step S1.

The update button 130*b* is a button for an instruction for obtaining the examination information to be displayed on the examination list display field 130*a*.

The vertical scroll bar 130*c* and the horizontal scroll bar 130*d* are operation devices for displaying information that cannot be displayed in the examination list display field 130*a*.

The past examination tab 130*e* is a tab for an instruction for transition to the additional information display screen 131.

Next, the controller 101 generates additional information for supporting round radiography (Step S3).

In Step S3, the controller 101 generates pieces of additional information associated with the respective pieces of obtained examination information.

For example, the controller 101 obtains, from the radiographic result information storage 104*b*, the latest n (n is a positive integer) pieces among pieces of radiographic result information that have the patient information (patient ID) and radiography site coinciding with those in the obtained examination information, and generates the additional information.

For example, the controller 101 obtains at least any of the panel size, irradiation condition, information about appropriateness of a radiographic image, radiographic difficulty, information about trimming of the radiographic image, and information on a radiographer in the radiographic result information obtained from the radiographic result information storage 104*b*, and generates the additional information. If the change flag ON is added to the panel size, the panel size to which the change flag ON is added is obtained as information about change from the predetermined panel size, and includes the information in the additional information. If the change flag ON is added to the irradiation condition, the irradiation condition to which the change flag ON is added is obtained as information about change from the predetermined irradiation condition, and includes the information in the additional information.

Note that the controller 101 may obtain the latest n pieces among pieces of radiographic result information that have the patient information (patient ID) and radiography site coinciding with those in the obtained examination information, from an external database outside of the round radiography system 10, and generate the additional information. The external database may be, for example, the RIS 30, the PACS 40, a console (another console) that is other than the main body 1 and is connectable via the communication network N, the HIS, the electronic medical record system or the like.

For example, with a certain capacity of the storage 104 of the main body 1, pieces of the radiographic result information with a predetermined time period having elapsed from radiography are sometimes removed from the radiographic result information storage 104*b*. In such a case, if the configuration where the radiographic result information is stored in the PACS 40 is adopted, the controller 101 may obtain, from the PACS 40, the removed pieces of the radiographic result information among the latest n pieces of the radiographic result information. For example, in a case where m (m is a positive integer; n≤m) times of radiography among the latest m times are performed by another console, and the radiographic result information is stored in the other console, the m pieces of radiographic result information may be obtained from the other console. In a case in which there is information that is not stored in the radiographic result information storage 104*b*, the controller 101 may appropriately obtain the information from the RIS 30, the PACS 40, the other console, the HIS, the electronic medical record system or the like.

If the subject H is a first-visit patient, there is no radiographic result information on past radiography. If there is no radiographic result information corresponding to the subject H in the radiographic result information storage 104*b* or the external database, the controller 101 obtains pieces of radiographic result information on patients (subjects) having a physical size similar to that of the subject H that are on the coinciding radiography site, from the radiographic result information storage 104*b* or a database of an external apparatus, and generates the additional information. As for the patients having a physical size similar to that of the subject H, for example, a physical size (e.g., large, medium, or small) is estimated based on the height and the weight in the patient information on the subject H included in the examination information, and patients having physical size information coinciding with that on the estimated physical size are regarded as patients having a physical size similar to that of the subject H. As for the method of estimating the physical size based on the height and the weight, for example, a conversion table between the height and/or the weight, and the physical size (large, medium, or small) is preliminarily stored in the storage 104, and estimation may be made based on the conversion table.

The generated additional information is temporarily stored in the additional information storage 104*c*.

Next, in accordance with operation through the operation receiver 102, the controller 101 causes the display 103 to display the generated additional information (Step S4).

Figure 5:
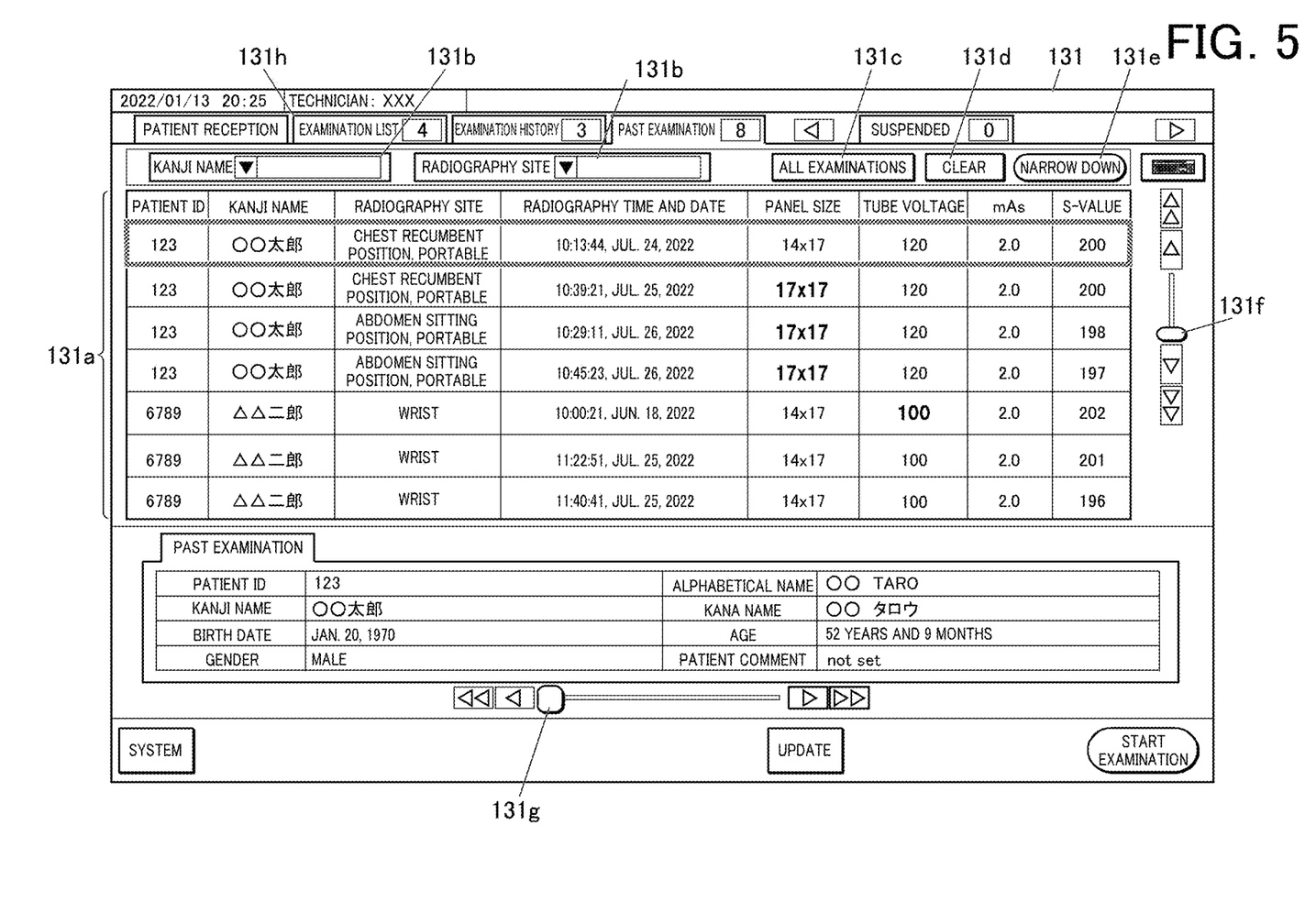
FIG. 5 shows an example of an additional information display screen.

For example, the controller 101 displays the generated additional information, on the additional information display screen 131 that is of a tab other than the examination list screen 130. That is, when a tab (e.g., the past examination tab 130*e* in FIG. 4) for displaying the additional information display screen 131 is pressed on the examination list screen 130 through the operation receiver 102, the controller 101 displays the additional information display screen 131. Note that according to this embodiment, the description is made assuming that the additional information display screen 131 is a screen on a tab other than the examination list screen 130. Alternatively, this screen may be a screen displayed on a monitor other than the display 103, or a screen displayed on a terminal other than the main body 1. Alternatively, the additional information may be displayed on the same screen as the examination list screen 130. For example, the additional information may be displayed as a dialog on the screen identical to the examination list screen 130.

FIG. 5 shows an example of the additional information display screen 131 displayed on the display 103. As shown in FIG. 5, the additional information display screen 131 is provided with an additional information display field 131a, a narrow-down condition input field 131b, an all examinations button 131c, a clear button 131d, a narrow-down button 131e, a vertical scroll bar 131f, a horizontal vertical scroll bar 131g, etc.

The additional information display field 131a is a field for list-displaying the additional information generated in Step S3.

The narrow-down condition input field 131b is a field for receiving a narrow-down condition for the additional information to be displayed on the additional information display field 131a. After an item is selected in the narrow-down condition input field 131b, a narrow-down condition is input, and the narrow-down button 131e is pressed, pieces of additional information satisfying the input condition are displayed in the additional information display field 131a.

The all examinations button 131c is a button for issuing an instruction for displaying the pieces of additional information on all the patients, irrespective of the pieces of additional information on the patient in the obtained examination information.

The clear button 131d is a button for issuing an instruction for clearing the input narrow-down condition.

The vertical scroll bar 131f and the horizontal vertical scroll bar 131g are operation devices for displaying information that cannot be displayed in the additional information display field 131a.

When the controller 101 displays the additional information on the additional information display field 131a, this controller highlights the appropriate items of the radiographic conditions (e.g., the panel size, and irradiation conditions) changed from predetermined radiographic conditions with respect to the radiography site. As described above, in the additional information, a change flag ON is added to each of items of radiographic conditions changed from the radiographic conditions predetermined with respect to the radiography site. The controller 101 highlights each item to which the change flag ON is added in the additional information. For example, the controller 101 displays the character color or background color of each appropriate item as a color different from normal one, thus achieving such highlighting. In FIG. 5, the highlighting is achieved by displaying characters in a dark color. Alternatively, a predetermined mark may be added to each appropriate item in the additional information, and displayed.

For example, when the patient information and the radiography site are input in the narrow-down condition input field 131b through the operation receiver 102, and the narrow-down button 131e is pressed, the controller 101 narrows down the pieces of additional information to be displayed to pieces of additional information that satisfy the narrow-down condition, and displays the narrowed down pieces in the additional information display field 131a. That is, the user (technician) inputs patient information on and a radiography site of an examination scheduled to be performed, in the narrow-down condition input field 131b, and presses the narrow-down button 131e, thereby allowing themself to refer to the additional information for supporting round radiography of the radiography subject patient (subject H).

Note that if patient information on a first-visit patient is input into the narrow-down condition input field 131b, there is no additional information on the first-visit patient, and no additional information is retrieved accordingly. If no additional information corresponding to the patient information input into the narrow-down condition input field 131b is retrieved from the additional information storage 104c, the controller 101 may identify a patient having a physical size similar to that of the patient in the input patient information, narrow down information to the additional information on the identified patient, and display the narrowed down information, on the additional information display field 131a, as described above. For example, if the patient information on a first-visit patient and a radiography site are input into the narrow-down condition input field 131b, and the narrow-down button 131e is pressed through the operation receiver 102, the controller 101 may identify a patient having a physical size similar to that of the patient in the input patient information, narrow down information to the additional information that is on the identified patient and is on the input radiography site, and display the narrowed down information on the additional information display field 131a. In the case of displaying on the additional information display field 131a, there is no additional information on the patient concerned. Accordingly, it is preferable to also display that additional information on a patient having a similar physical size is displayed.

Accordingly, even if the radiography subject patient is a first-visit patient, the user can easily refer to the additional information for supporting round radiography.

The user refers to the panel size used for radiographing the same site of the radiography subject patient or the patient having a physical size similar to that of the radiography subject patient as the radiography site this time, thereby allowing an FPD cassette 3 having a correct size to be prepared even if the patient is not present at the place. Consequently, an unnecessary operation, such as bringing a wrong FPD cassette 3 and returning to take a correct one, can be prevented, thus allowing smooth round radiography. Furthermore, any resultant retake due to radiography with an inappropriate FPD cassette 3 can be prevented.

The user can easily determine the irradiation condition by referring to a past irradiation condition used when radiographing the same site of the radiography subject patient or the patient having a physical size similar to that of the radiography subject patient as the radiography site this time.

The user can easily grasp the appropriateness of the irradiation condition by referring to information about appropriateness of a radiographic image when radiographing the same site of the radiography subject patient or the patient having a physical size similar to that of the radiography subject patient as the radiography site this time. For example, if the appropriateness of the radiographic image is low, the irradiation condition can be changed form the irradiation condition at the time, and an appropriate irradiation condition can be set.

The user can easily verify the retake risk by referring to radiographic difficulty when radiographing the same site of the radiography subject patient or the patient having a physical size similar to that of the radiography subject patient as the radiography site this time. The necessity of a support device can be grasped, and a positioning support staff can be prepared.

The user can easily grasp the size of the irradiation field and the degree of trimming, by referring to information about trimming of the radiographic image when radiographing the same site of the radiography subject patient or the patient having a physical size similar to that of the radiography subject patient as the radiography site this time.

The user can easily grasp which piece should be referred to in a case of a plurality of pieces of additional information, by referring to information on a radiographer when radiographing the same site of the radiography subject patient or the patient having a physical size similar to that of the radiography subject patient as the radiography site this time. For example, if the panel size used by a radiographer having ability equivalent to the own ability is larger than the panel size used by a radiographer having rich experience or high ability, a panel used by a radiographer having experience and ability close to the own ones is selected, which can avoid a loss of the radiography site etc.

The user can recognize that a panel size different from a normal one is required, by referring to information (highlighted) indicating change from a predetermined panel size when radiographing the same site of the radiography subject patient or the patient having a physical size similar to that of the radiography subject patient as the radiography site this time. Consequently, erroneous selection of the FPD cassette 3 can be avoided.

The user can recognize that setting of an irradiation condition different from a normal one is required, by referring to information (highlighted) indicating change from a preset irradiation condition when radiographing the same site of the radiography subject patient or the patient having a physical size similar to that of the radiography subject patient as the radiography site this time. Consequently, an appropriate irradiation dose can be set, and the dose can be optimized.

For example, the user designates, as a narrow-down condition, a ward where round radiography is scheduled to be performed and narrows down the additional information to what is to be displayed in the ward, and can prepare the FPD cassette 3 having a size in conformity with the ward (e.g., a small size in a case of a pediatric ward) by referring to the panel size in the additional information for the ward where radiography is to be performed.

The user presses the all examinations button 131c and displays the additional information without narrowing down to the radiography subject, and furthermore, designates a ward and a requesting department and performs a search, thereby allowing the user to grasp the characteristics of the radiographic conditions and the like for each ward and each requesting department.

In a case of radiographing a radiography site having not high radiography frequency, the user presses the all examinations button 131c and displays the additional information without narrowing down to the radiography subject, and furthermore, designates a radiography site and performs a search, thereby allowing the user to grasp the characteristics of the radiographic conditions and the like for the radiography site.

By narrowing down the radiography time and date, the number of pieces of additional information to be displayed is reduced, which can improve the viewability.

The user refers to the displayed additional information, prepares the FPD cassette 3 and the like, and goes to a radiography place, such as a ward.

Figure 6:
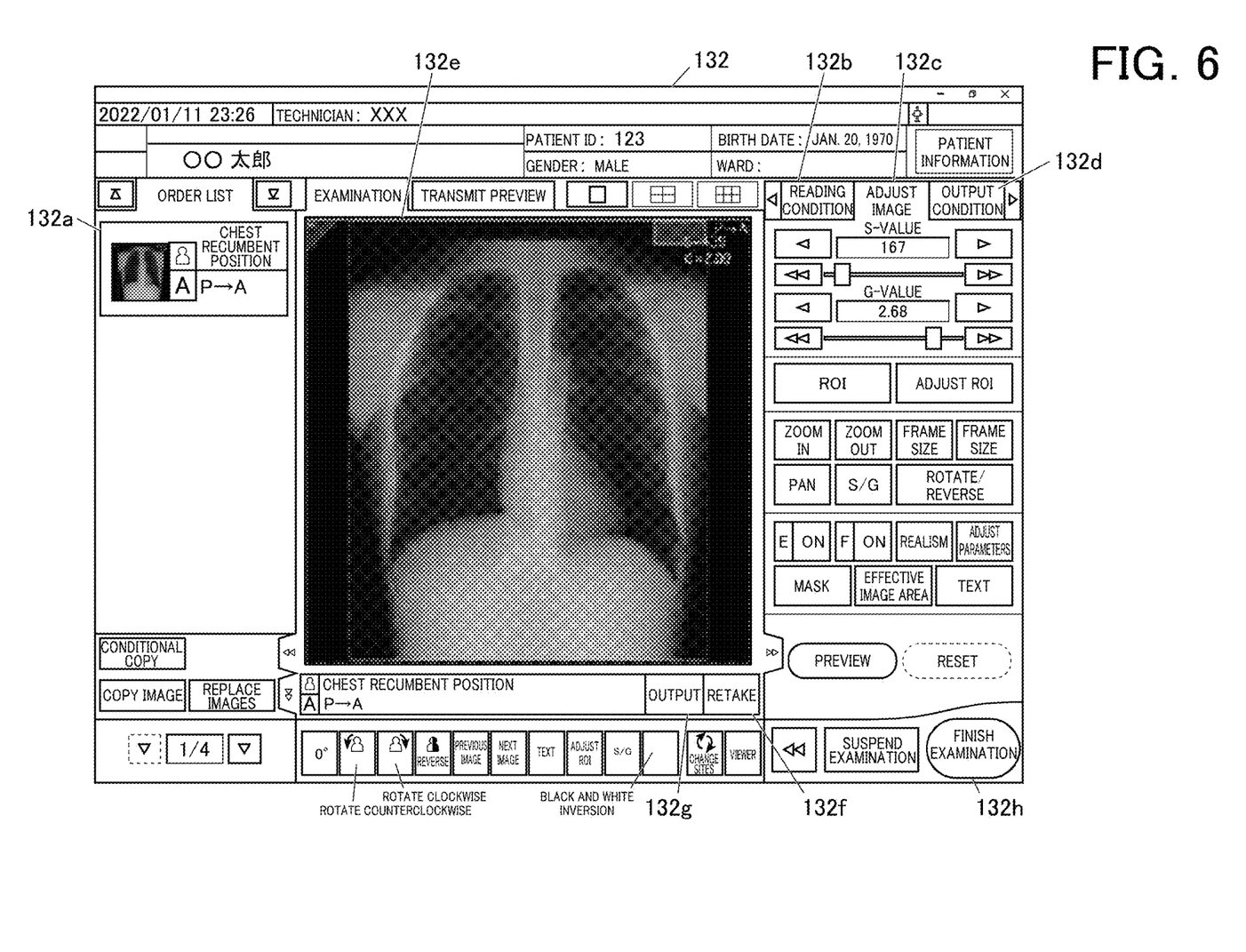
FIG. 6 shows an example of an examination screen.

Next, in accordance with operation through the operation receiver 102, the controller 101 causes the display 103 to display an examination screen 132 (Step S5).

For example, an examination list tab 131h of the additional information display screen 131 is pressed to display the examination list screen 130, and the examination information on the examination of the radiography subject is selected from the examination list screen 130, and then the controller 101 displays the examination screen 132 of the selected examination, on the display 103.

FIG. 6 shows an example of the examination screen 132. As shown in FIG. 6, the examination screen 132 is provided with, for example, a radiography selection button (a radiographic error button) 132a, a reading condition tab 132b, an image adjustment tab 132c, an output condition tab 132d, an image display area 132e, a retake button 132f, an output button 132g, an examination finish button 132h, etc.

The radiography selection button 132a is a button for selecting radiography to be performed next while details of radiography included in the examination information (the radiography site, radiography direction, etc.) are displayed. When the radiography selection button 132a is selected, the controller 101 reads the irradiation conditions (the tube voltage, mAs value, tube current, irradiation time period, source to image distance, etc.) predetermined for the radiography site displayed on the selected radiography selection button 132a, from a radiographic condition table in the storage 104, and sets the conditions as irradiation conditions used for radiography.

The reading condition tab 132b is a tab for displaying a setting field for setting the reading conditions for the FPD cassette 3. The reading conditions may include, for example, the panel size.

The image adjustment tab 132c is a tab for displaying an adjustment field for adjusting image processing parameters for a radiographic image.

The output condition tab 132d is a tab for displaying a setting field for output conditions for a radiographic image. As the output conditions, for example, the trimming size can be set.

The image display area 132e is an area for displaying the radiographic image obtained by radiography.

The retake button 132f is a button for issuing an instruction for a retake.

The output button 132g is a button for image output, i.e., issuing an instruction for transmitting the radiographic image to the PACS 40.

The examination finish button 132h is a button for issuing an instruction for finishing the examination.

The controller 101 sets the radiographic conditions in accordance with operation on the examination screen 132 through the operation receiver 102 (Step S6).

For example, when the radiography selection button 132a is selected, the controller 101 sets the irradiation conditions predetermined for the radiography site displayed on the selected radiography selection button 132a, as the irradiation conditions used for radiography. Note that the main body 1 is provided with, for example, an operation panel for inputting the irradiation conditions. When irradiation conditions different from the predetermined irradiation conditions are intended to be set, the setting can be changed through the control board. When the reading condition tab 132b is operated and the panel size is selected, the controller 101 sets the selected panel size as a reading condition. The controller 101 stores the set irradiation conditions and panel size, in the RAM. If the set irradiation conditions and panel size are not the irradiation conditions and panel size predetermined for the radiography site, the controller 101 adds a change flag ON to each of conditions changed from the predetermined conditions, and stores them in the RAM.

After the radiographic condition is set, the user positions the subject H. When the radiography preparation is completed, the user presses the exposure switch 102a, and issues an instruction for radiography.

When the exposure switch 102a is pressed, the controller 101 controls the driver 106 with the set irradiation condition, causes the radiation source 2 to emit radiation, and causes the FPD cassette 3 to take a radiographic image (radiograph) of the subject H (Step S7).

At timing when the radiation is received from the radiation source 2, the FPD cassette 3 generates a radiographic image where the radiography site is taken, and transmits image data on the image to the main body 1.

When the radiographic image is received (obtained) by the first communicator 105a, the controller 101 applies image processing to the received radiographic image (Step S8), and displays the radiographic image in the image display area 132e of the examination screen 132 (Step S9).

Next, the controller 101 determines whether an instruction for image adjustment has been issued through the operation receiver 102 or not (Step S10).

If the controller 101 determines that the instruction for image adjustment has been issued (Step S10: YES), this controller performs the image adjustment (image processing) in accordance with the operation through the operation receiver 102 (Step S11), and the processing transitions to Step S12.

If the controller 101 determines that the instruction for image adjustment has not been issued (Step S10: NO), this controller causes the processing to transition to Step S12.

In Step S12, the controller 101 determines whether the trimming size has been set through the operation receiver 102, and an instruction for a trimming has been determined or not (Step S12).

If the controller 101 determines that the instruction for trimming has been issued (Step S12: YES), this controller trims the radiographic image with the set trimming size (Step S13), and the processing transitions to Step S14. The controller 101 stores the set trimming size, in the RAM.

If the controller 101 determines that the instruction for trimming has not been issued (Step S12: NO), this controller causes the processing to transition to Step S14.

In Step S14, the controller 101 determines whether the retake button 132f has been pressed through the operation receiver 102 and an instruction for a retake has been issued or not (Step S14).

If the controller 101 determines that an instruction for a retake has been issued (Step S14: YES), this controller increments a counter for the number of retakes provided in the RAM (Step S15), returns the processing to Step S6, and performs a retake in accordance with a user operation.

If the controller 101 determines that an instruction for a retake has not been issued (Step S14: NO), this controller determines whether the output button 132g has been pressed and an instruction for image output has been issued through the operation receiver 102 or not (Step S16).

If the controller 101 determines that the instruction for image output has not been issued through the operation receiver 102 (Step S16: NO), this controller returns the processing to Step S10.

If the controller 101 determines that an instruction for image output has been issued through the operation receiver 102 (Step S16: YES), this controller generates radiographic result information pertaining to radiograph this time, and stores the information (Step S17).

For example, the controller 101 generates the radiographic result information by obtaining not only basic information, such as the patient information, radiography site, radiography time and date, ward, and requesting department, which pertain to radiography performed this time, but also at least any of, the panel size, irradiation condition, information about appropriateness of a radiographic image, radiographic difficulty, information about trimming of the radiographic image, information on a radiographer, information about change from predetermined radiographic conditions, and physical size information on a subject.

For example, the controller 101 calculates the dose indices (EI, DI, EIT, etc.), based on the irradiation condition at the time of radiography and the radiographic image, and obtains the calculated exposure indices as information about appropriateness of the radiographic image. Alternatively, the controller 101 may calculate the S-value based on the radiographic image, and obtain the calculated S-value as information about appropriateness of the radiographic image. Alternatively, input of information (A, B, C, etc.) about appropriateness of the radiographic image by the user may be accepted, and the input information may be obtained as information about appropriateness of the radiographic image.

For example, the controller 101 obtains the number of retakes stored in the RAM, as the radiographic difficulty. Alternatively, input of the radiographic difficulty (A, B, C, etc.) by the user may be accepted, and the radiographic difficulty may thus be accepted.

The controller 101 obtains the user name of the user logging in the round radiography system 10 (i.e., the technician name of the technician having performed radiography), as information on the radiographer.

The controller 101 obtains the height, weight and the like of the subject H from the examination information, RIS 30, or HIS, and obtains the physical size information (large, medium, or small) of the subject H, based on the obtained height and weight. Alternatively, image analysis may be applied to the radiographic image, and the physical size information on the patient may be obtained. For example, if the radiography site (or region of interest) protrudes from a radiographic image having a certain size, it may be determined that the size is large (or medium) among large, medium, and small, and may determine the physical size information as large (or medium).

The controller 101 obtains the radiographic conditions (the panel size and the irradiation condition), and the information about trimming of the radiographic image, which are stored in the RAM. If the change flag ON is added to the panel size and the irradiation condition, information about change from the predetermined radiographic conditions is obtained.

The controller 101 associates the obtained pieces of information with the basic information, such as the patient information, radiography site, radiography time and date, ward, and requesting department, generates the radiographic result information, and stores (saves) the generated information in the radiographic result information storage 104b. The radiographic image may be included in the radiographic result information and stored.

Note that the controller 101 may identify which item of information in the additional information the user has used and determined the radiographic condition and the trimming size actually used for radiography, add a flag (selection flag) to the identified item, and store them as the radiographic result information. In this case, the controller 101 may make the user select which item of the additional information has been used to determine the radiographic condition and the trimming size, and thus obtain them. Alternatively, it may be estimated from the radiographic condition and the trimming size latest used by the controller 101.

The controller 101 associates the patient information and the examination information (examination ID, examination time and date, radiography site, radiography direction, etc.) with the radiographic image obtained by radiography, and transmits the information to the PACS 40 through the second communicator 105*b* (Step S18).

In Step S18, the radiographic result information may further be associated with the radiographic image obtained by radiography, be transmitted to the PACS 40 through the second communicator 105*b*, and be stored in the PACS 40. Not only to the PACS 40, but also to an external apparatus, such as another console, RIS 30, HIS, or electronic medical record system, connectable via the communication network N, part of or the entire radiographic result information may be transmitted and shared.

Next, the controller 101 determines whether an instruction for finishing the examination has been issued through the operation receiver 102 or not (Step S19).

If the controller 101 determines that the instruction for finishing the examination has not been issued (Step S19: NO), this controller returns the processing to Step S6.

If the controller 101 determines that the instruction for finishing the examination has been issued (Step S19: YES), this controller finishes the round radiography process.

As described above, the controller 101 of the main body 1 of the round radiography system 10 obtains the examination information on the examination that performs round radiography, and generates additional information for assisting round radiography in the examination that obtains the examination information. The controller 101 then displays, on the display 103, the obtained examination information, and the generated additional information. The additional information is at least any of a panel size, information about appropriateness of a radiographic image, radiographic difficulty, information about trimming of the radiographic image, information on a radiographer, and information about change from predetermined radiographic conditions, in past radiography of a subject of the examination or a subject having a physical size similar to that of the subject.

Consequently, the controller 101 generates the additional information effective for supporting round radiography, and displays the information on the display 103, thereby allowing the user to perform round radiography effectively.

The description details in the aforementioned embodiment are a preferable example of the present invention. There is no limitation to this.

For example, the additional information display screen 131 may be displayed in cooperation with selection of the examination of the radiography subject (target examination) on the examination list screen 130.

For example, if the examination information on the target examination of the round radiography scheduled to be performed is selected (e.g., double-clicked) on the examination list screen 130 through the operation receiver 102, or the examination information on the target examination is selected and subsequently a predetermined button is pressed, the controller 101 may cause the display content on the display 103 to transition to the additional information display screen 131. At this time, the controller 101 narrows down information to additional information related to the selected examination, and displays the additional information. For example, the controller 101 narrows down information to the patient information on the selected examination, and additional information on the radiography site, and displays the narrowed-down information. Alternatively, the information is narrowed down to additional information which is on patients having a physical size similar to that of the patient of the selected examination and in which the radiography site is identical, and the narrowed down information is displayed. When the a predetermined button, e.g., an examination start button or the like is pressed on the additional information display screen 131, the controller 101 may cause the display content on the display 103 to transition to the examination screen 132 for the target examination, and allow radiography of the target examination to be started.

Alternatively, if the examination information on the target examination of the round radiography scheduled to be performed is selected (e.g., double-clicked) on the examination list screen 130 through the operation receiver 102, or the examination information on the target examination is selected and subsequently a predetermined button is pressed, the controller 101 may display additional information related to the target examination as a dialog, instead of displaying the additional information display screen 131.

Preferably, it is switchable by setting for each user and for each facility whether to display the examination screen 132 via the additional information display screen 131 or to display the examination screen 132 not via the additional information display screen 131 when the target examination is selected on the examination list screen 130.

It may be configured so that when one of the pieces of additional information displayed on the additional information display screen 131 is selected, the controller 101 displays detailed information on the selected piece of additional information. It may be configured so that when one of the pieces of additional information displayed on the additional information display screen 131 is selected, the controller 101 reutilizes (copies) the radiographic conditions of the selected piece of additional information, for the radiographic conditions this time. That is, the radiographic conditions of the selected piece of additional information may be set as the radiographic conditions this time.

The controller 101 may recommend and display a specific radiographic condition among the pieces of additional information related to the target examination.

For example, the controller 101 may present, as a recommended panel size, the maximum-sized one of FPD cassettes 3 used in past examinations of the patient of the target examination. Alternatively, from the examinations in last one year, the physical size information on the patient may be estimated, and a panel size conforming to the physical size may be presented as an estimated panel size. A display field for displaying recommended radiographic conditions may be separately provided on the additional information display screen 131, or be displayed as pop-up display or the like when a predetermined button (e.g., "recommendation" button) is pressed.

The controller 101 may perform a determination process for selecting a target to be recommended and display only one recommended radiographic condition or multiple recommended radiographic conditions in accordance with the recommendation degree, according to the determination process, rearrange the order of the recommendation display in accordance with the recommendation degree, and display it.

In a case where the resolution can be set as a reading condition, the controller 101 may include the resolution in the radiographic result information, and store the information. When the resolution set as the reading condition is changed from a resolution predetermined for the radiography site, a change flag ON may be associated with the resolution in the radiographic result information and stored. If the change flag ON is associated with the resolution in the radiographic result information, the controller 101 may include, in the additional information, information indicating change from a predetermined resolution in past radiography of the subject H.

In the above description, the example is disclosed where the hard disk, the semiconductor nonvolatile memory or the like is used as a computer-readable medium for the program according to the present invention. However, there is no limitation to this example. As another computer-readable medium, a portable recording medium, such as a CD-ROM, may be applied. Carrier waves are also applicable as a medium of providing data on the program according to the present invention via a communication line.

Furthermore, detailed configurations and detailed operation of the apparatuses that constitute the round radiography system 10 can be changed as appropriate within a range not deviating from the gist of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A round radiography system performing round radiography using a radiographic imaging apparatus, the system comprising:
a hardware processor that obtains examination information on an examination performing round radiography, and generates additional information for supporting the round radiography in the examination; and
a display that displays the obtained examination information, and the generated additional information,
wherein
the additional information is at least any of a size of the radiographic imaging apparatus, information about appropriateness of a radiographic image, radiographic difficulty, information about trimming of the radiographic image, information on a radiographer, and information about change from a predetermined radiographic condition, in past radiography of a subject of the examination or a subject having a physical size similar to that of the subject.

2. The round radiography system according to claim 1, wherein the information about change from the predetermined radiographic condition is information indicating change from a predetermined size of the radiographic imaging apparatus or resolution, or information indicating change from a predetermined irradiation condition.

3. The round radiography system according to claim 1, wherein the hardware processor generates the additional information, based on a predetermined number of last radiographic results of the subject of the examination or the subject having the physical size similar to that of the subject.

4. A console for round radiography, comprising:
a hardware processor that obtains examination information on an examination performing round radiography, and generates additional information for supporting the round radiography in the examination, using a radiographic imaging apparatus; and
a display that displays the obtained examination information, and the generated additional information,
wherein
the additional information is at least any of a size of the radiographic imaging apparatus, information about appropriateness of a radiographic image, radiographic difficulty, information about trimming of the radiographic image, information on a radiographer, and information about change from a predetermined radiographic condition, in past radiography of a subject of the examination or a subject having a physical size similar to that of the subject.

5. A non-transitory computer-readable recording medium storing a program for causing a computer of a round radiography system to execute:
obtaining examination information on an examination performing round radiography, using a radiographic imaging apparatus;
generating additional information for supporting the round radiography in the examination; and
causing a display to display the obtained examination information, and the generated additional information,
wherein the additional information is at least any of a size of the radiographic imaging apparatus, information about appropriateness of a radiographic image, radiographic difficulty, information about trimming of the radiographic image, information on a radiographer, and information about change from a predetermined radiographic condition, in past radiography of a subject of the examination or a subject having a physical size similar to that of the subject.

* * * * *